United States Patent
Chen et al.

(10) Patent No.: US 12,251,820 B2
(45) Date of Patent: Mar. 18, 2025

(54) PNEUMATIC SOFT GRABBING SENSING DEVICE

(71) Applicant: SOOCHOW UNIVERSITY, Suzhou (CN)

(72) Inventors: Tao Chen, Suzhou (CN); Zhiwei Dai, Suzhou (CN); Minglu Zhu, Yihuai (CN); Huibin Jia, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/026,537

(22) PCT Filed: Oct. 26, 2022

(86) PCT No.: PCT/CN2022/127632
§ 371 (c)(1),
(2) Date: Mar. 15, 2023

(87) PCT Pub. No.: WO2024/027024
PCT Pub. Date: Feb. 8, 2024

(65) Prior Publication Data
US 2024/0042623 A1 Feb. 8, 2024

(51) Int. Cl.
*B25J 15/00* (2006.01)
*B25J 15/10* (2006.01)
*B25J 15/12* (2006.01)

(52) U.S. Cl.
CPC ......... *B25J 15/0023* (2013.01); *B25J 15/103* (2013.01); *B25J 15/12* (2013.01)

(58) Field of Classification Search
CPC ...... B25J 15/0023; B25J 15/10; B25J 15/103; B25J 15/12; B25J 19/025
(Continued)

(56) References Cited

U.S. PATENT DOCUMENTS 3,343,864 A * 9/1967 Baer ............... B25J 15/12
                                                    92/92
3,981,528 A * 9/1976 Andorf ............ B25J 15/0023
                                                    92/92
(Continued)

FOREIGN PATENT DOCUMENTS

CN      104959992 A    10/2015
CN      206484587 U     9/2017
(Continued)

*Primary Examiner* — James R Bidwell
(74) *Attorney, Agent, or Firm* — SZDC Law PC

(57) ABSTRACT

A pneumatic soft grabbing sensing device includes a support; a flexible grabbing mechanism including at least two flexible claws, wherein the at least two flexible claws are arranged on the support in a circumferential direction, each flexible claw includes a telescopic air bag, an adapter mechanism and a flexible plate connected with the adapter mechanism, the telescopic air bag is hollow and elongated, the telescopic air bag includes a closed end, an open end and an air bag main body connected between the closed end and the open end, the air bag main body includes at least two air bag bodies and a node portion formed between adjacent air bag bodies, and the adapter mechanism is connected to the node portion, the closed end and open end; and a sensing mechanism including at least two sensing parts, the sensing parts being arranged on inner sides of the corresponding flexible plates.

5 Claims, 11 Drawing Sheets

(58) Field of Classification Search
USPC .......................................................... 294/196
See application file for complete search history.

(56) References Cited

U.S. PATENT DOCUMENTS

| | | | | |
|---|---|---|---|---|
| 4,350,381 | A | * | 9/1982 | Hellmann ............ B25J 15/0009 901/37 |
| 4,784,042 | A | * | 11/1988 | Paynter ................. F15B 15/103 92/92 |
| 5,156,081 | A | * | 10/1992 | Suzumori ................ B25J 15/12 92/92 |
| 10,118,301 | B2 | * | 11/2018 | Lessing .................... B25J 9/142 |
| 10,189,168 | B2 | * | 1/2019 | Lessing ................ B25J 15/0071 |
| 10,456,929 | B1 | * | 10/2019 | Miller .................. B25J 15/0023 |
| 2006/0028041 | A1 | * | 2/2006 | Ono ......................... B25J 9/142 294/119.3 |
| 2019/0202070 | A1 | | 7/2019 | Nakagawa et al. |
| 2021/0347063 | A1 | * | 11/2021 | Zhang ................. B25J 15/0009 |

FOREIGN PATENT DOCUMENTS

| | | | | |
|---|---|---|---|---|
| CN | 108326833 | A | | 7/2018 |
| CN | 110625641 | A | | 12/2019 |
| CN | 111300460 | A | * | 6/2020 |
| CN | 111687870 | A | | 9/2020 |
| CN | 111791250 | A | * | 10/2020 |
| CN | 113211491 | A | * | 8/2021 |
| CN | 114434471 | A | | 5/2022 |
| JP | H10235586 | A | | 9/1998 |

\* cited by examiner

PNEUMATIC SOFT GRABBING SENSING DEVICE

This application is the National Stage Application of PCT/CN2022/127632, filed on Oct. 26, 2022, which claims priority to Chinese Patent Application No. 202210922199.8, filed on Aug. 2, 2022, which is incorporated by reference for all purposes as if fully set forth herein.

FIELD OF THE DISCLOSURE

The present invention relates to the field of mechanical arm technologies, and particularly to a pneumatic soft grabbing sensing device.

BACKGROUND OF THE DISCLOSURE

A series of behaviors of the human hand include strong grasping, a delicate operation, an exchange gesture, or the like, and realization of the activities mainly depends on the complicated biomechanical structure and neural control of the human hand, which requires a developed mechanical arm to have plural degrees of freedom in structure and some flexibility in action.

Most of currently researched flexible mechanical arms are driven by motors, gas or liquid, functional materials, or the like. With a change of an application environment of the mechanical arm, in recent years, various types of flexible grippers emerge, such as soft claws driven by artificial muscles or motor pull wires, soft-driver flexible claws made of soft materials (such as silicone rubber, electroactive polymers, gels, or the like), or the like. A pneumatic flexible driver mainly includes rubber and reinforced fibers, has high adaptability and flexibility, and can be configured to safely grab soft, fragile, tender and other objects. In most traditional three-finger mechanical arm claws, rigid connecting rods are driven by motors or hydraulic pressures; although the mechanical arm claw has a high clamping capacity, the mechanical arm claw has defects of a single grabbing mode, insufficient flexibility, poor adaptability, or the like, and particularly, the mechanical arm claw cannot grip soft, fragile, damageable or various-shape items, such as fruits, vegetables, cups, or the like.

SUMMARY OF THE DISCLOSURE

In order to overcome defects in a prior art, an object of the present invention is to provide a pneumatic soft grabbing sensing device.

In order to achieve the above object, an embodiment of the present invention provides the following technical solution.

A pneumatic soft grabbing sensing device, comprising:
 a support;
 a flexible grabbing mechanism comprising at least two flexible claws, wherein the at least two flexible claws are arranged on the support in a circumferential direction, each flexible claw comprises a telescopic air bag, an adapter mechanism and a flexible plate connected with the adapter mechanism, the telescopic air bag is hollow and elongated, the telescopic air bag comprises a closed end, an open end and an air bag main body connected between the closed end and the open end, the air bag main body comprises at least two air bag bodies and a node portion formed between adjacent air bag bodies, and the adapter mechanism is connected to the node portion, the closed end and the open end;
 a sensing mechanism comprising at least two sensing parts, the sensing parts being arranged on inner sides of the corresponding flexible plates.

The present invention has the beneficial effects as follows.
(1) A structure is simple, an operation is easy, and safety is high.
(2) The device increases flexibility of a mechanical arm to prevent damage to an object caused by an excessively large grabbing force.
(3) With fixation between the open end, the closed end and the node portion of the telescopic air bag and the flexible plate, the telescopic air bag is deflated and inflated to change a bending direction of the air bag, so as to grab the object.
(4) The grabbing force of the device is controlled by changing an inflation quantity and a deflation quantity.
(5) The sensing part is integrated on a grabbing surface to achieve functions of automatically detecting and identifying the object and automatically grabbing the object by the mechanical arm, and therefore, an automation degree is high.

Figure 1:
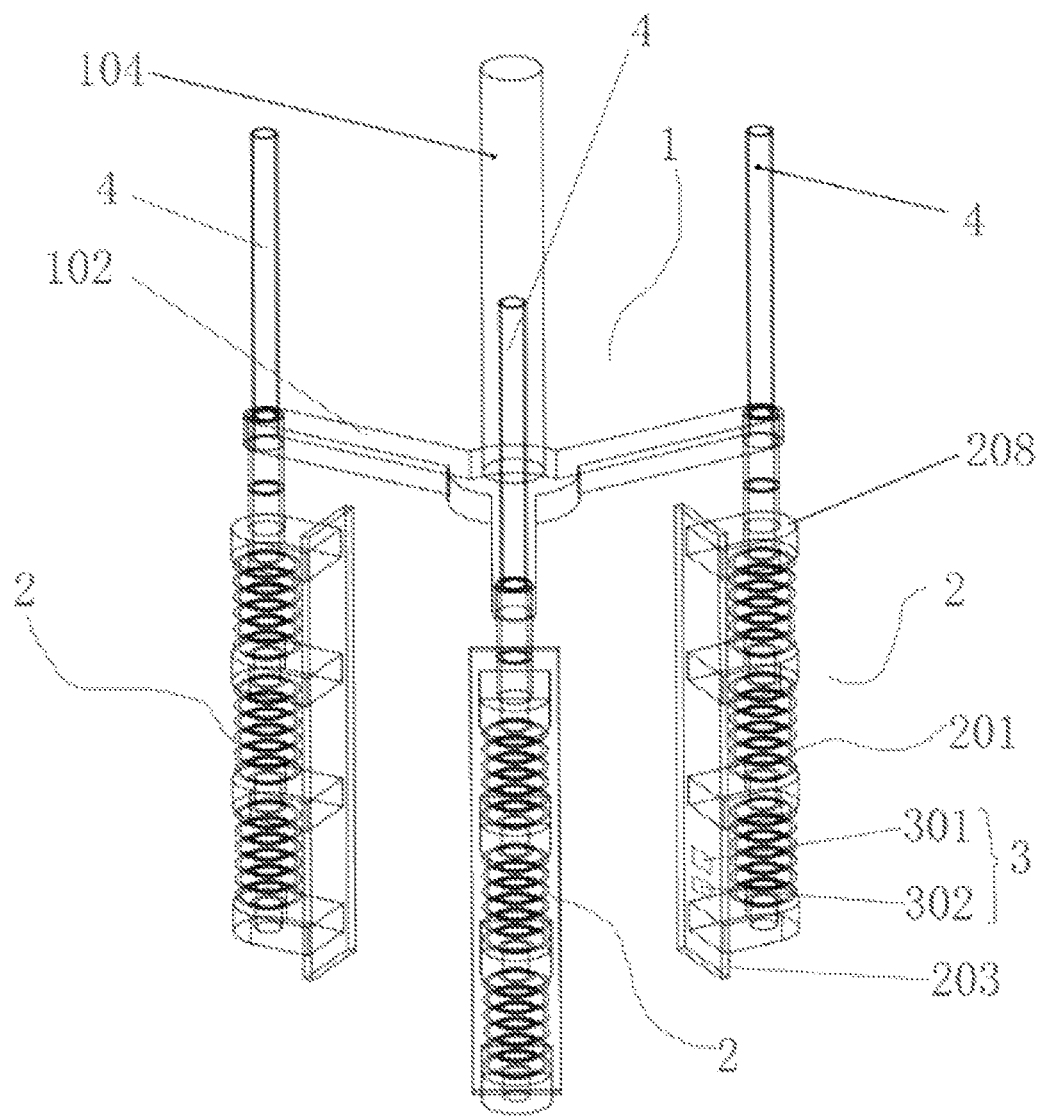
FIG. 1 is a schematic structural diagram of a preferred embodiment of the present invention.
Figure 2:
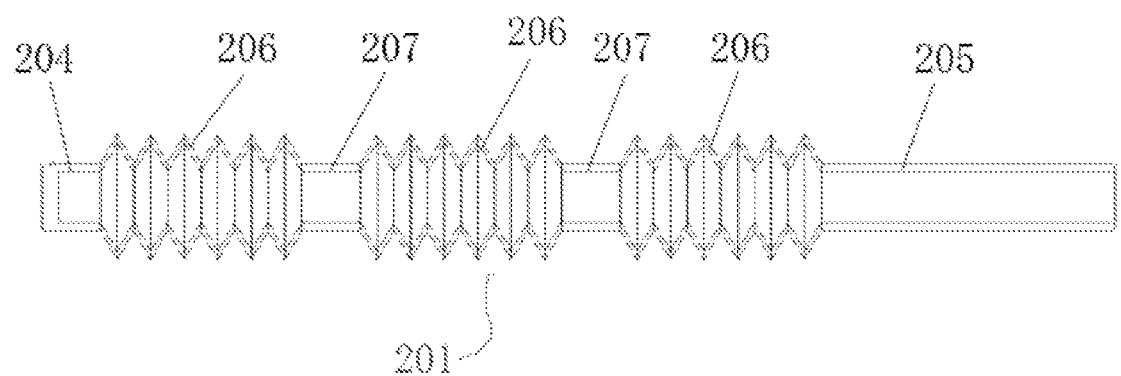
FIG. 2 is a schematic structural diagram of a telescopic air bag in a preferred embodiment of the present invention.
Figure 3:
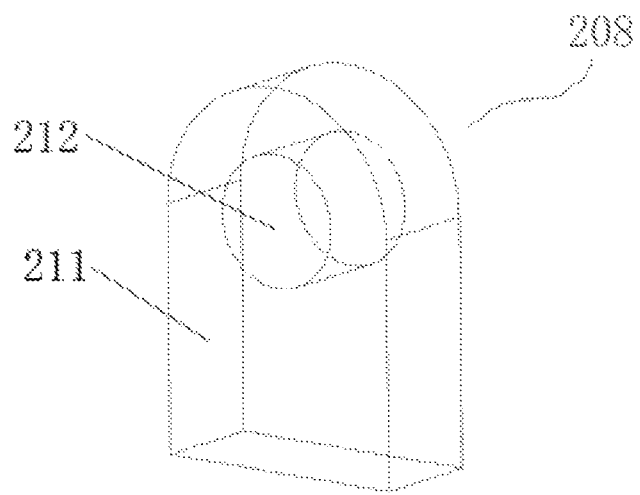
FIG. 3 is a schematic structural diagram of an adapter plate in a preferred embodiment of the present invention.
Figure 4:
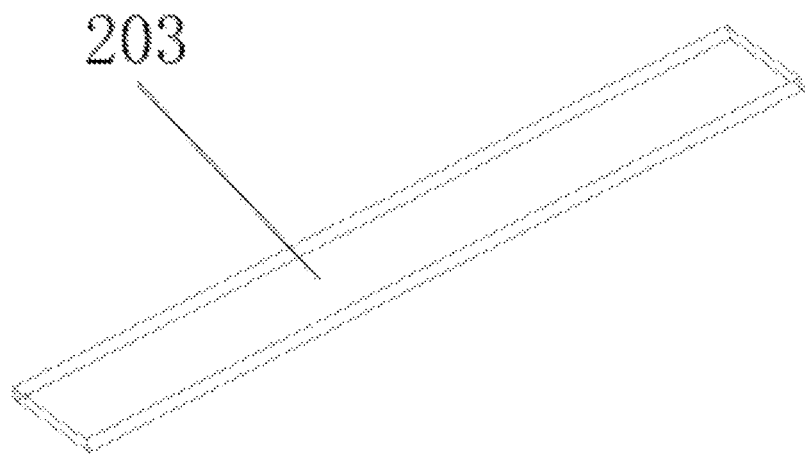
FIG. 4 is a schematic structural diagram of a flexible plate in a preferred embodiment of the present invention.
Figure 5:
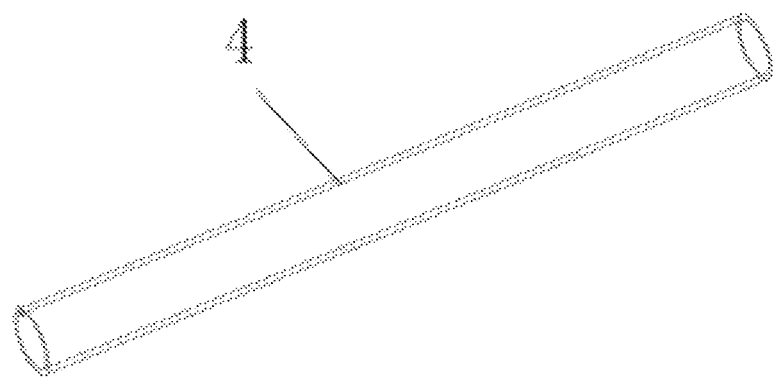
FIG. 5 is a schematic structural diagram of an air pipe in a preferred embodiment of the present invention.
Figure 6:
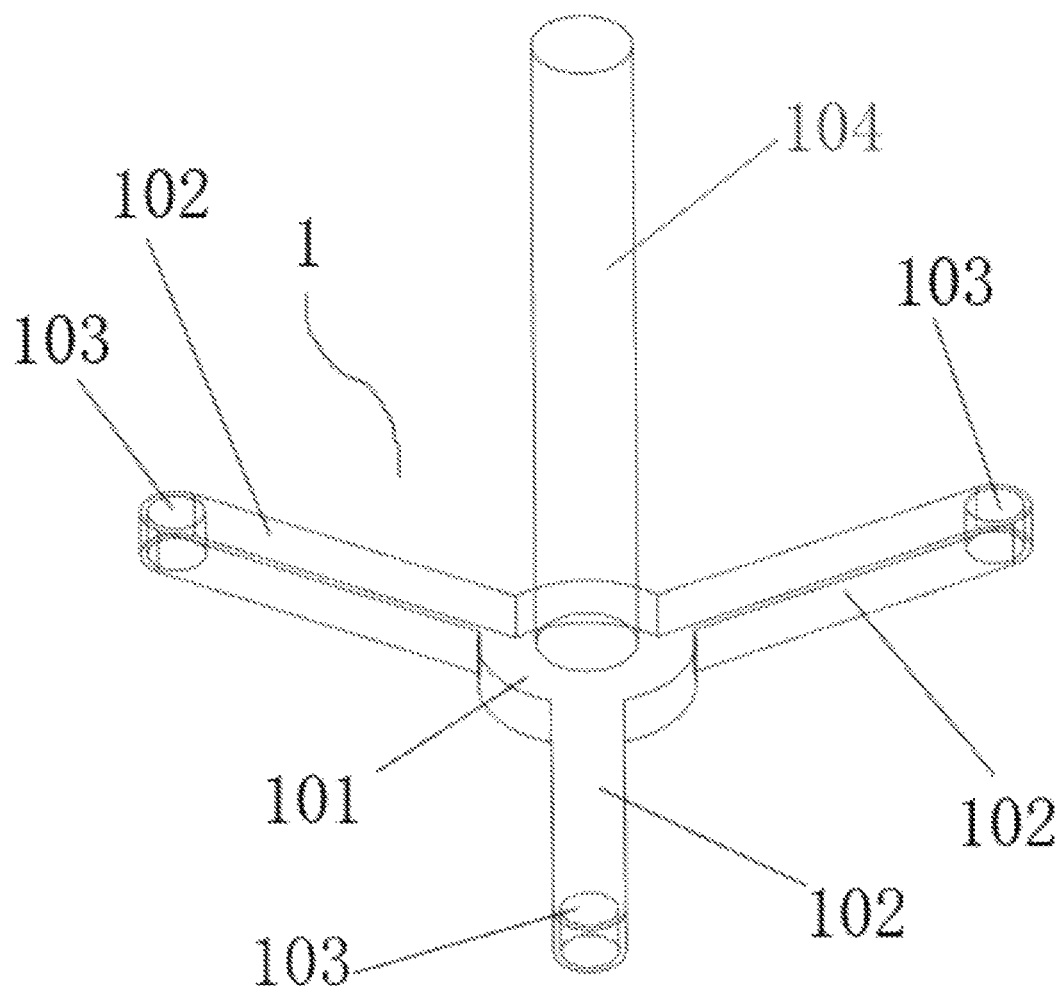
FIG. 6 is a schematic structural diagram of a support in a preferred embodiment of the present invention.
Figure 7:
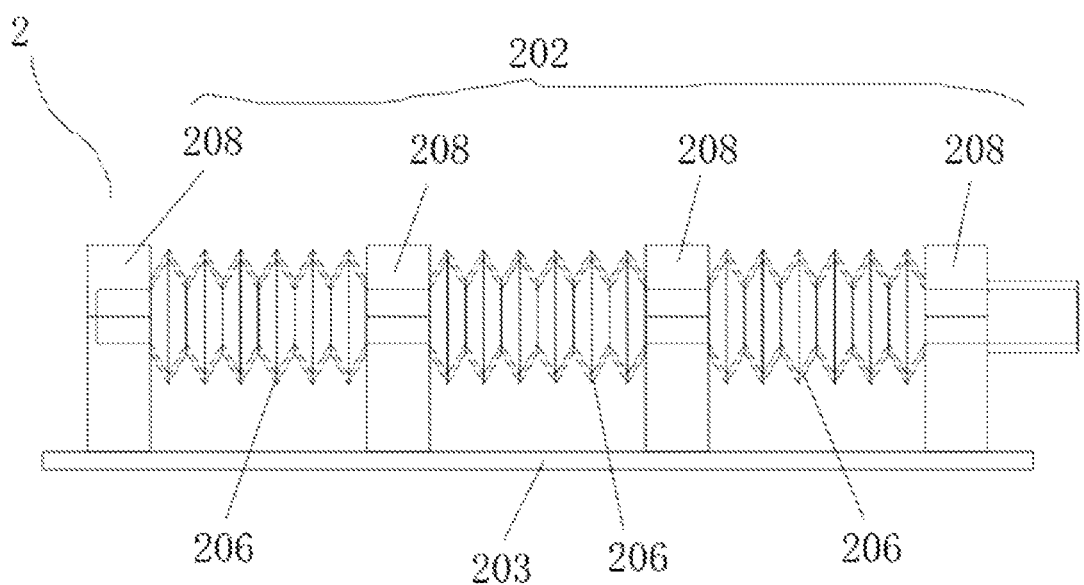
FIG. 7 is a schematic structural diagram of a flexible claw in a preferred embodiment of the present invention.

In the drawings: 1. support; 101. support seat; 102. horizontal rod; 103. through hole; 104. vertical rod; 2. flexible claw; 201. telescopic air bag; 202. adapter mechanism; 203. flexible plate; 204. closed end; 205. open end; 206. air bag body; 207. node portion; 208. adapter plate; 211. adapter plate body; 212. circular clamping hole; 3. sensing part; 301. first sensor; 302. second sensor; 4. air pipe.

DETAILED DESCRIPTION OF PREFERRED EMBODIMENTS

Referring to FIGS. 1 to 7, an embodiment of the present application discloses a pneumatic soft grabbing sensing device, including:

a support 1;

a flexible grabbing mechanism including at least two flexible claws 2, wherein the at least two flexible claws 2 are arranged on the support 1 in a circumferential direction, each flexible claw 2 includes a telescopic air bag 201, an adapter mechanism 202 and a flexible plate 203 connected with the adapter mechanism 202, the telescopic air bag 201 is hollow and elongated, the telescopic air bag 201 includes a closed end 204, an open end 205 and an air bag main body connected between the closed end 204 and the open end 205, the air bag main body includes at least two air bag bodies 206, and a node portion 207 formed between adjacent air bag bodies 206, and gas can enter the telescopic air bag 201 or exit the telescopic air bag 201 through the open end 205 of the telescopic air bag 201, so as to inflate and deflate the telescopic air bag 201 from the outside; the adapter mechanism 202 is connected to the node portion 207, the closed end 204 and the open end 205, and when the telescopic air bag 201 deforms, the adapter mechanism 202 drives the flexible plate 203 to make corresponding actions;

a sensing mechanism including at least two sensing parts 3, the sensing parts 3 being arranged on inner sides of the corresponding flexible plates 203.

In order to facilitate the inflation and deflation of the telescopic air bag 201 and meanwhile facilitate mounting of the telescopic air bag 201, an air introduction mechanism is further provided, the air introduction mechanism includes at least two air pipes 4, the at least two air pipes 4 are connected to the support 1, and the other end of the telescopic air bag 201 is communicated with the air pipes 4.

In the present embodiment, the adapter mechanism 202 includes a plurality of adapter plates 208, and the node portion 207, the closed end 204, and the open end 205 are sleeved with the plurality of adapter plates 208 respectively.

In order to facilitate the sleeving of the adapter plate 208, the node portion 207, the closed end 204, and the open end 205 are preferably in a circular pipe shape.

Specifically, the adapter plate 208 includes an adapter plate body 211 and a circular clamping hole 212 formed in the adapter plate body 211, the node portion 207, the closed end 204, and the open end 205 penetrate through the corresponding circular clamping holes 212, and an outer side of the flexible plate 203 is fixedly connected to the adapter plate body 211.

Preferably, the support 1 includes a support seat 101 and at least two horizontal rods 102 circumferentially arranged on the support seat 101. In the present embodiment, the air pipe 4 is clamped at the horizontal rod 102.

In order to facilitate connection between the horizontal rod 102 and the air pipe 4, preferably, a free end of the horizontal rod 102 is provided with a through hole 103, and the air pipe 4 penetrates through the through hole 103 to be communicated with the telescopic air bag 201.

In order to facilitate assembly on a moving mechanism for driving the grabbing sensing device to move to a to-be-grabbed object, preferably, a middle of the support seat 101 is provided with a vertical rod 104.

Specifically, the support seat 101 is circular, such that the horizontal rods 102 are conveniently and uniformly arranged on the support seat 101 in the circumferential direction.

In the present embodiment, three flexible claws 2 are provided and evenly arranged on the support 1 in the circumferential direction, so as to improve grabbing stability.

The flexible plate 203 may be made of PDMS, but the material is not limited to PDMS and may be ecoflex.

The sensing part 3 includes a first sensor 301 and a second sensor 302, the first sensor 301 is configured to detect the object, and the second sensor 301 is configured to detect whether the object is grabbed. The first sensor 301 and the second sensor 302 are located at a lower portion of an inner side of the flexible plate 203, and the first sensor 301 and the second sensor 302 are arranged close to each other. In the present embodiment, preferably, the first sensor 301 is configured as an optical fiber sensor, and the second sensor 302 is configured as a pressure sensor.

Figure 8:
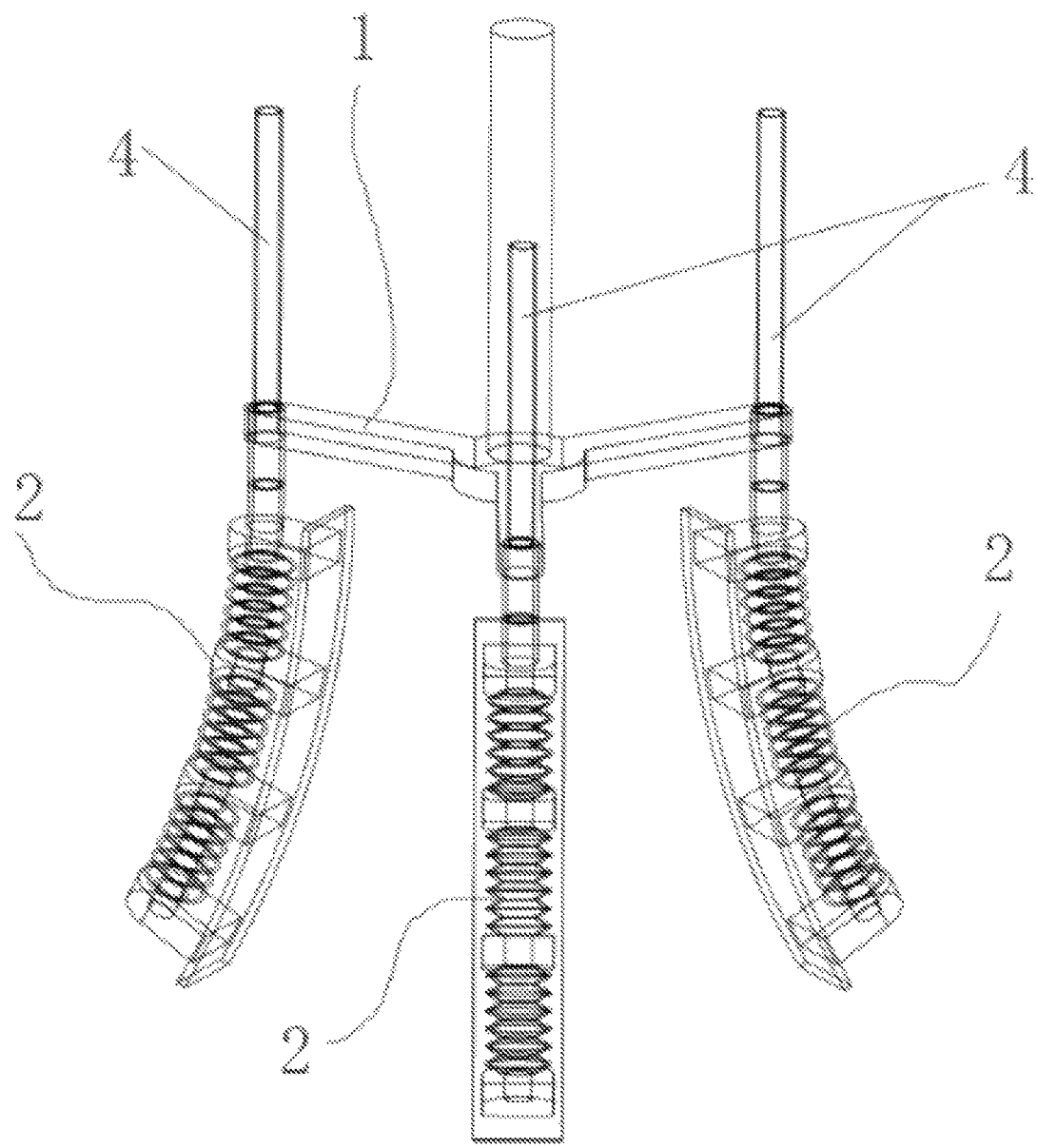
FIG. 8 is a schematic structural diagram of an open flexible claw in a preferred embodiment of the present invention.
Figure 9:
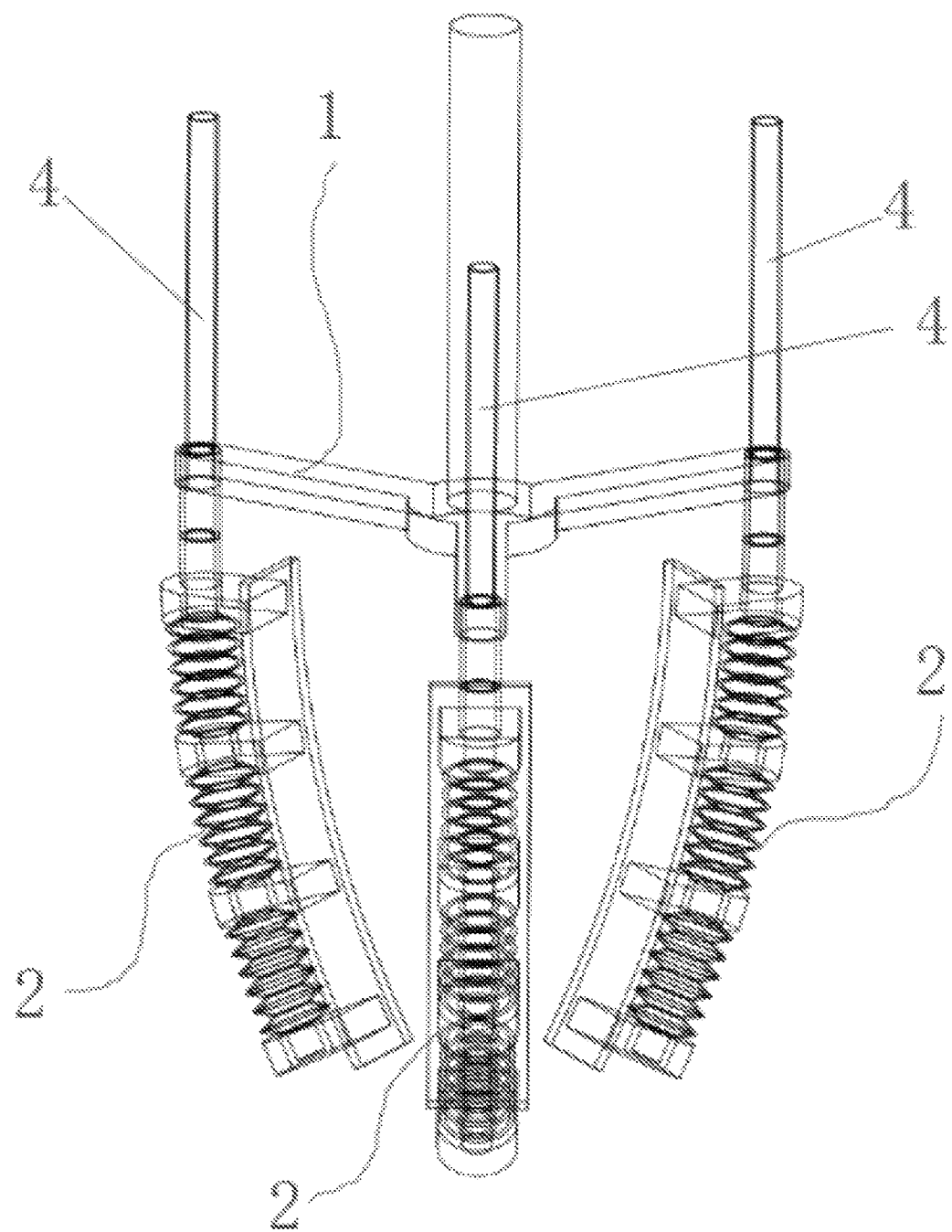
FIG. 9 is a schematic structural diagram of a flexible claw performing grabbing in a preferred embodiment of the present invention.
Figure 10:
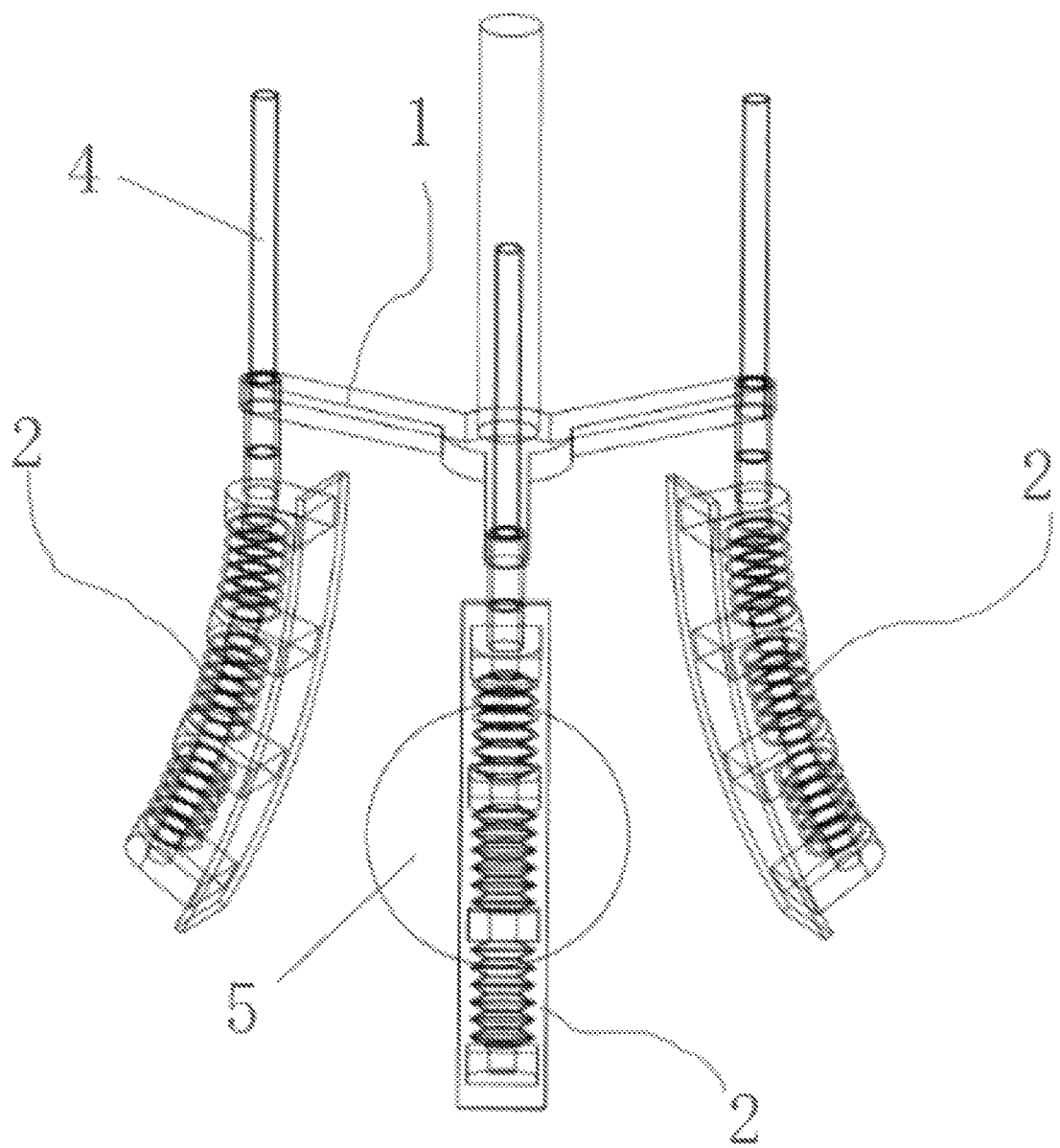
FIG. 10 is a schematic state diagram of a preferred embodiment of the present invention before a ball is grabbed.
Figure 11:
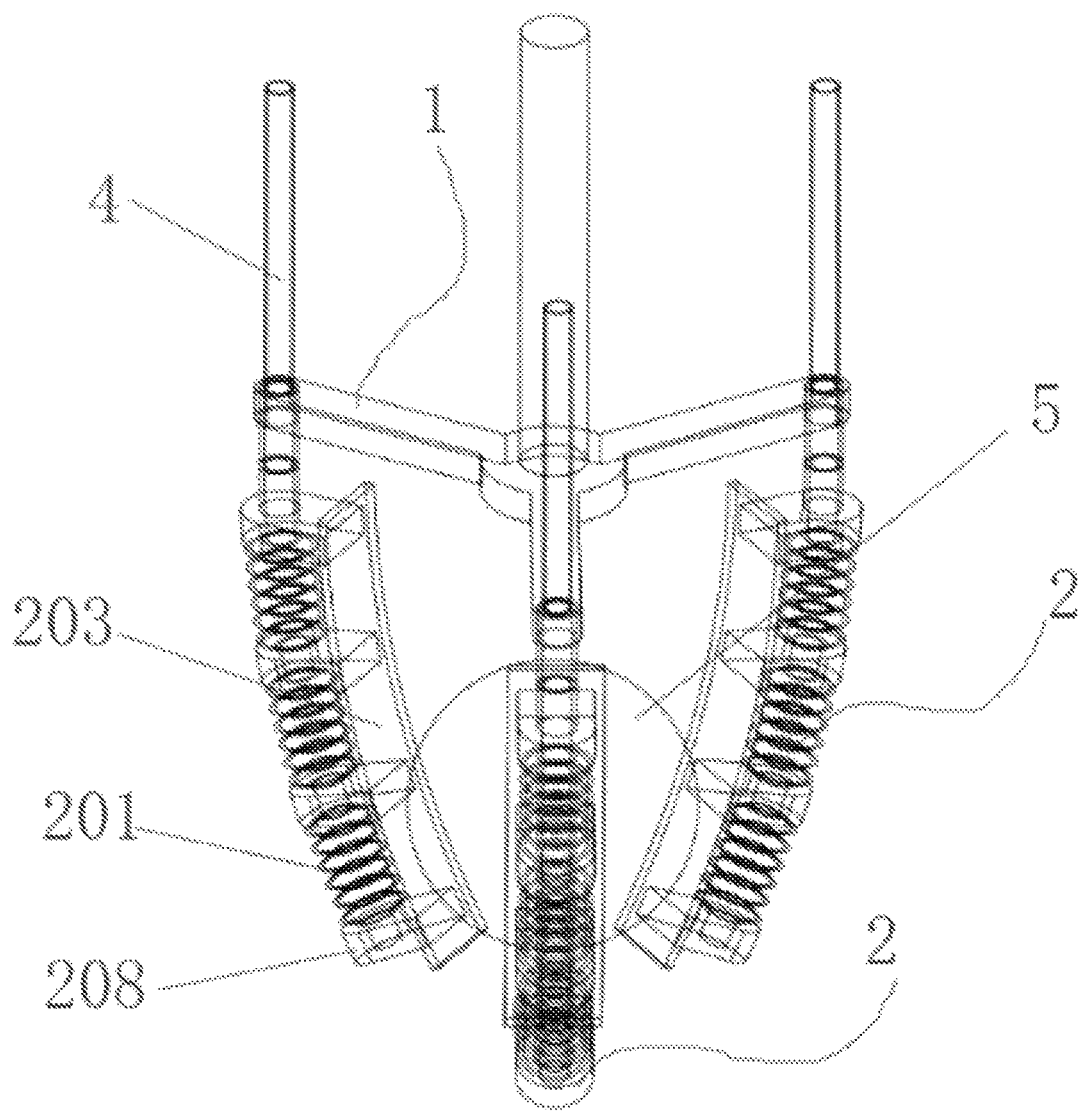
FIG. 11 is a schematic state diagram of a preferred embodiment of the present invention after a ball is grabbed.
Figure 12:
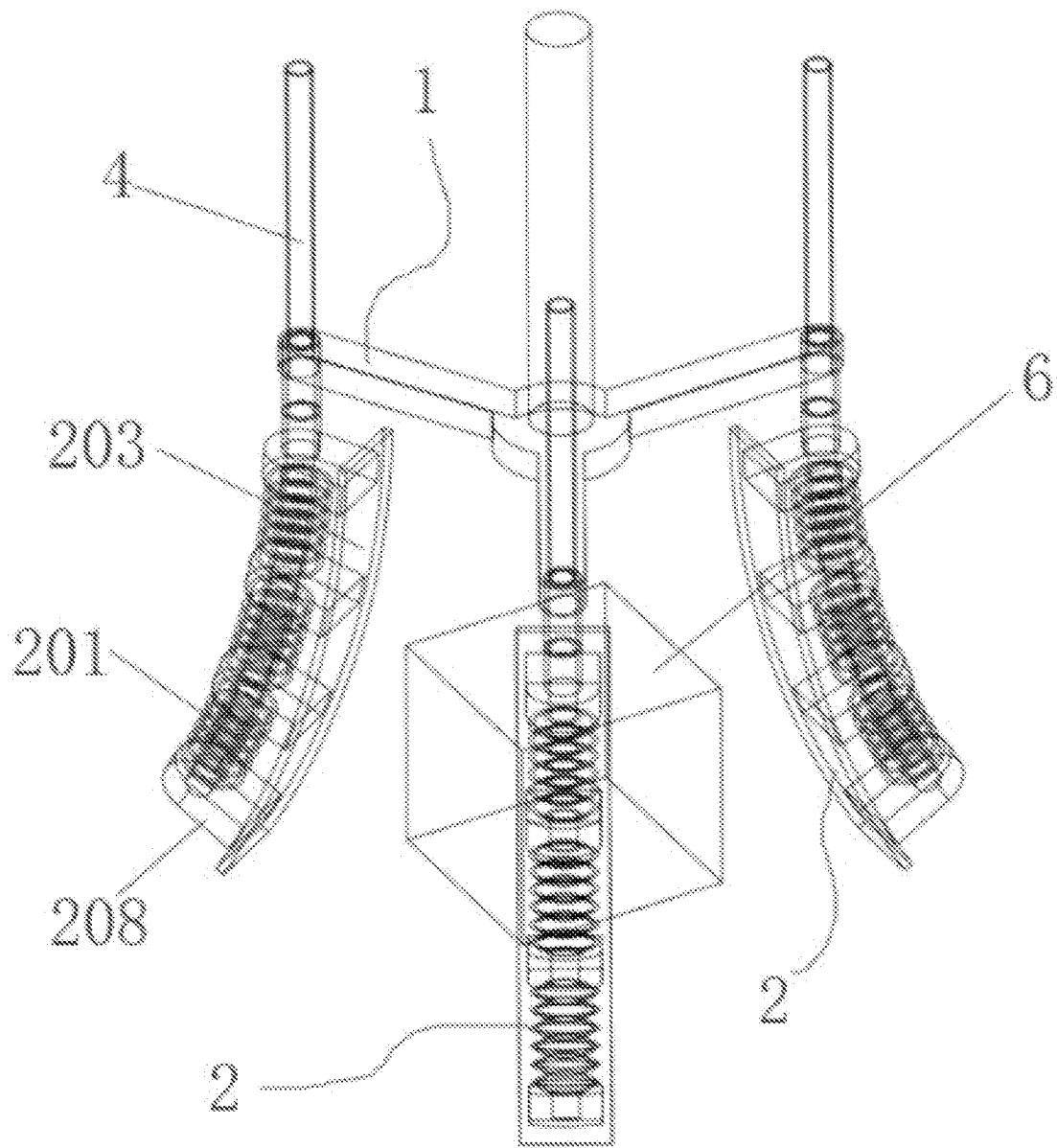
FIG. 12 is a schematic state diagram of a preferred embodiment of the present invention before a cube is grabbed.
Figure 13:
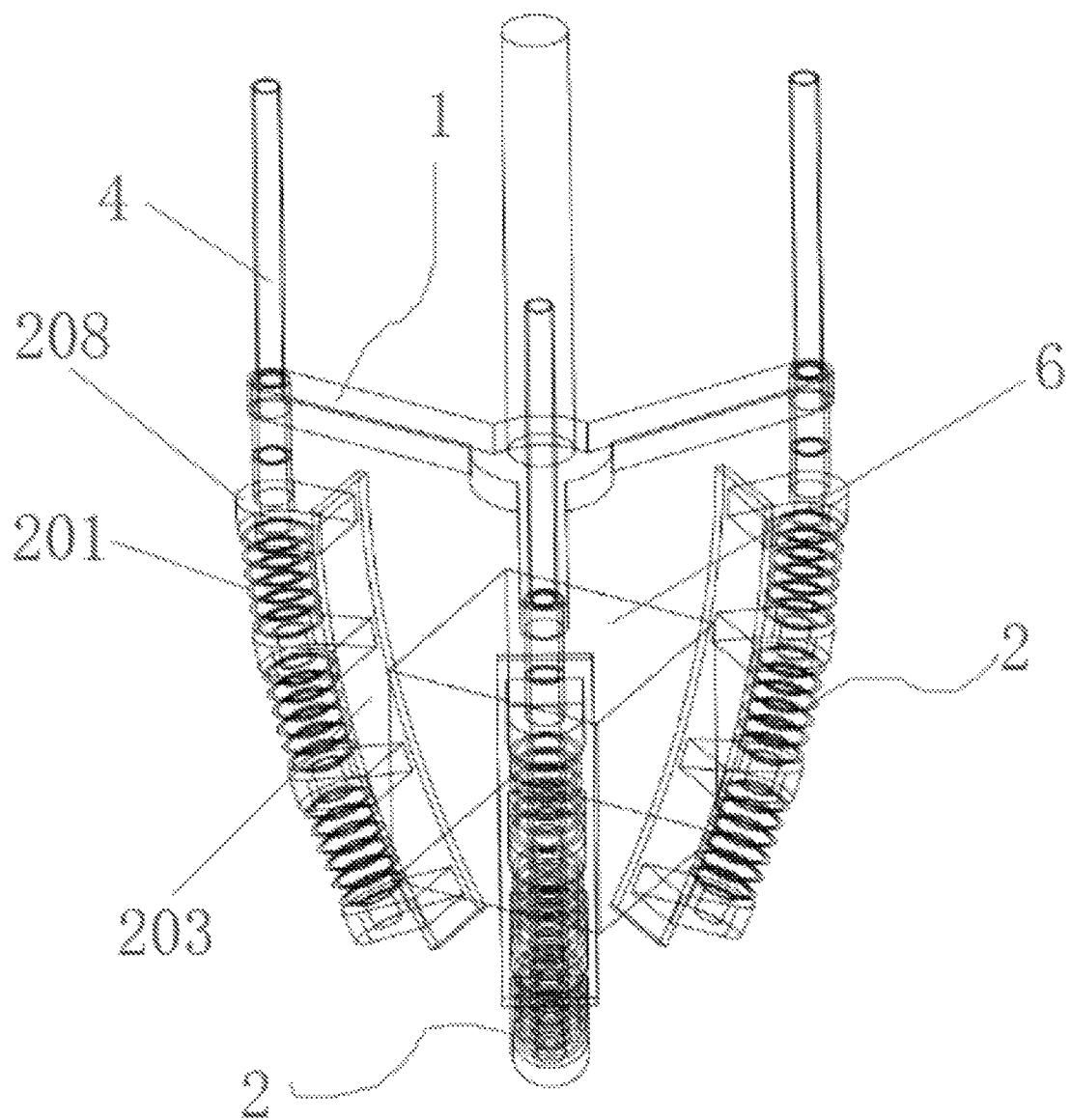
FIG. 13 is a schematic state diagram of a preferred embodiment of the present invention after a cube is grabbed.

In an initial state, an air pump is controlled to pump air from the air pipe 4, the telescopic air bag 201 bends outwards to allow the flexible claw 2 to be opened, as shown in FIG. 8, the device moves, and when the first sensor 301 detects the object, the device moves to the position of the to-be-grabbed object and transmits a signal to the system, and after the system receives the signal, the air pump is controlled to inflate the air pipe 4, the telescopic air bag 201 bends inwards to allow the flexible claw 2 to bend inwards to grab the object, as shown in FIG. 9, and when the second sensor 302 detects the signal, the object is grabbed, and subsequent actions can be performed. FIG. 10 is a schematic state diagram before a ball is grabbed, and FIG. 11 is a schematic state diagram after the ball is grabbed. FIG. 12 is a schematic state diagram before a cube is grabbed, and FIG. 13 is a schematic state diagram after the cube is grabbed.

It will be evident to those skilled in the art that the invention is not limited to the details of the foregoing illustrative embodiments, and that the present invention may be embodied in other specific forms without departing from the spirit or essential attributes thereof

What is claimed is:

1. A pneumatic soft grabbing sensing device, comprising:
    a support;
    a flexible grabbing mechanism comprising three flexible claws, wherein the three flexible claws are arranged on the support in a circumferential direction, each flexible claw comprises an expandable air bag, an adapter mechanism and a flexible plate connected with the adapter mechanism, the expandable air bag is hollow and elongated, the expandable air bag comprises a closed end, an open end and an air bag main body connected between the closed end and the open end, the air bag main body comprises at least two air bag bodies and a node portion formed between adjacent air bag bodies, and the adapter mechanism is connected to the node portion, the closed end and the open end;
    a sensing mechanism comprising at least two sensing parts, the sensing parts being arranged on inner sides of the corresponding flexible plates; and
    an air introduction mechanism,
    wherein the flexible plate comprises a biodegradable and compostable plastic substrate;
    wherein the three flexible claws are provided and evenly arranged on the support in the circumferential direction;
    wherein the air introduction mechanism comprises three air pipes, the three air pipes are connected to the support and have a slender column shape, and the open end of each of the three expandable air bags is communicated with each of the three air pipes;
    wherein the support comprises a support seat and three horizontal rods circumferentially arranged on the support seat; and wherein free ends of the three horizontal rods are each provided with a rounded through hole, and each of the three air pipes passes through each of the rounded through holes to communicate with each of the expandable air bags.

2. The pneumatic soft grabbing sensing device according to claim 1, wherein the adapter mechanism comprises a plurality of adapter plates, and the node portion, the closed end, and the open end are sleeved with the plurality of adapter plates respectively.

3. The pneumatic soft grabbing sensing device according to claim 2, wherein the node portion, the closed end, and the open end are in a circular pipe shape.

4. The pneumatic soft grabbing sensing device according to claim 3, wherein the adapter plate comprises an adapter plate body and a circular clamping hole formed in the adapter plate body.

5. The pneumatic soft grabbing sensing device according to claim 1, wherein the support seat is circular.

* * * * *